US00RE37560E

(19) United States
(12) Reissued Patent
Elings

(10) Patent Number: US RE37,560 E
(45) Date of Reissued Patent: Feb. 26, 2002

(54) SCAN CONTROL FOR SCANNING PROBE MICROSCOPES

(75) Inventor: Virgil B. Elings, Santa Barbara, CA (US)

(73) Assignee: Veeco Instruments INC, Melville, NY (US)

(21) Appl. No.: 08/948,909

(22) Filed: Oct. 10, 1997

Related U.S. Patent Documents

Reissue of:
(64) Patent No.: 5,557,156
Issued: Sep. 17, 1996
Appl. No.: 08/353,399
Filed: Dec. 2, 1994

(51) Int. Cl.[7] ..... G01N 23/00
(52) U.S. Cl. ..... 310/316.01; 250/306
(58) Field of Search ..... 310/316.01, 317; 250/306, 307

(56) References Cited

U.S. PATENT DOCUMENTS 5,051,646 A * 9/1991 Elings et al. ..... 310/317
5,107,113 A * 4/1992 Robinson ..... 250/306
5,210,410 A * 5/1993 Barrett ..... 250/306
5,221,954 A * 6/1993 Harris et al. ..... 355/327
5,243,359 A * 9/1993 Fisli ..... 346/1.1
5,404,363 A * 4/1995 Nose et al. ..... 369/126
5,418,363 A * 5/1995 Elings et al. ..... 250/306
5,436,448 A * 7/1995 Hosaka et al. ..... 250/306
5,448,399 A * 9/1995 Park et al. ..... 359/372

OTHER PUBLICATIONS

Johnson et al., "Scophony Spatial Light Modulator", Optical Engineering, vol. 24, pp. 93–100, Jan. 1995.*

* cited by examiner

*Primary Examiner*—Thomas M. Dougherty

(57) ABSTRACT

A method of controlling a scanner, particularly a scanner for use in scanning probe microscopes such as an atomic force microscope, including the steps of generating a scan voltage which varies as a parametric function of time, applying the scan voltage to the scanner, sensing plural positions of the scanner upon application of the scan voltage, fitting a parametric function to the sensed scanner positions, and controlling at least one parameter of the scan voltage function based on the parametric function fitted to the sensed scanner positions in the fitting step. In a preferred embodiment, the scan voltage is a polynomial parametric function of time and the order of terms of the polynomial is set in relation to the size of the scan being controlled, with small scans having at least one order term and relatively larger scans having plural order terms. Thus, the sensed position data are used, not to control the motion of the scanner directly in a closed loop system, but instead to optimize the transducer calibration parameters for subsequent open looped scan control of a portion of a total scan, with the calibration of the transducer scan voltage parameters periodically occurring.

94 Claims, 5 Drawing Sheets

SCAN CONTROL FOR SCANNING PROBE MICROSCOPES

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to the control of piezoelectric and other scanners, and more specifically to scan control for scanning probe microscopy and other fields requiring a precision scanning stage.

2. Discussion of Background

Precision scanning stages are required by disciplines including scanning probe microscopy, beam lithography, and others. A common form of scanner for these applications is the piezoelectric scanner. The piezoelectric scanner comes in a variety of forms—single crystals, bimorphs, multilayer piezoelectric stacks, and tube scanners, for example. For all of these configurations, a voltage is applied across the piezoelectric elements and the position of some part of the piezoelectric scanner moves with respect to another part that is held fixed. This motion is used to scan samples, probes, lenses, etc., for a variety of purposes. Such scanners are often used to produce motion of the probe over the sample. However, motion of the sample stage with a fixed probe is equivalent for many applications and is also often employed.

Another kind of scanner is an electrostrictive scanner made typically out of PMN (lead-magnesium-niobate).

A very important area of application for such scanners is the field of scanning probe microscopes. In a scanning probe microscope such as the scanning tunneling microscope (STM) or the atomic force microscope (AFM), a probe is scanned across the surface of a sample to determine local properties of the surface such as topography or magnetic field strength so that these properties can be displayed for viewing. Alternately, the sample can be scanned relative to a fixed probe. Some of these microscopes, for example, the STM and AFM, have been constructed with the ability to resolve individual atoms. The scanner that provides the motion is usually a piezoelectric device adapted for moving in all three dimensions, i.e., the XY-plane and in the vertical (Z-axis) direction. Such three dimensional scanners have been built from discrete piezoelectric elements or from single tubes with internal and external electrodes segmented in a way to allow translation in all three dimensions (Binnig and Smith, Review of Scientific Instruments, Vol. 57 pp. 1688–89, (1986) and U.S. Pat. No. 4,087,715).

Images of the sample are usually created by scanning the probe over the sample in a so-called "raster" pattern, in the same way that an electron beam is used to create a television picture. For example, the probe is scanned at a high rate in the X-direction, back and forth across the sample, and at a low rate in the perpendicular (Y) direction. Data about the height, magnetic field or other local properties are collected as the probe is moved over the surface. To create such a scan pattern, it is necessary to apply scan voltages to the electrodes on the piezoelectric scanners. In the simplest case, where the piezoelectric sensitivity can be assumed to be constant, triangle waves may be applied to the X and Y electrodes to produce a linear raster pattern.

To resolve movement of a probe on the atomic scale, the scanning mechanism must be stable and accurately movable in increments on the Angstrom scale. Piezoelectric scanners have been widely used as such a stable and accurate scanning stage. In addition, there is great interest in scanning stages that have such precision and stability, but also have the ability to scan very large ranges, often over 100 microns, or to do small scans at various locations over a large field, at large offsets from the rest position. A system which must remain stable to 0.1 Angstrom and scan linearly over 100 microns is operating over a dynamic range of 1:10,000,000.

For small translations, piezoelectric scanners operate in a linear and reproducible way. That is, the displacement is proportional to the applied voltage. Thus at small amplitudes and for short times a piezoelectric transducer can be accurately described by its rest position, and its sensitivity, dX/dV. Unfortunately, piezoelectric scanners acquire a number of unwanted behaviors for translations on the micron scale and larger. At large scan voltages, the scanner's response can depend nonlinearly on the scan voltage and scan frequency. Also, in multiple axis scanners, there may be a coupling between the separate scan axes. The result is that a scan voltage applied to one axis may change the resulting motion on another axis. These unwanted behaviors in the piezoelectric response will mean that at large amplitudes, a linear signal applied to the piezo electrodes no longer produces a linear scan.

In addition to non-linearities and coupling, there may be other unwanted behaviors that make the scan pattern asymmetric when driven by a symmetric scan voltage. For example, piezoelectric scanners exhibit hysteresis such that as the direction of the applied voltage changes at the end of a scan, the position of the moving part of the piezoelectric scanner does not trace out its previous path. This is because the piezoelectric response to a scan voltage (sensitivity) is a function of the previous voltage history. Additional problems are caused by slow drifts in position caused by "creep." "Creep" is long term drift in position due to previous scan voltages applied to the scanner. There are also other drifts in the position of the scanner caused primarily by temperature variations and stresses in the scanner and its mounting hardware.

All of these effects conspire to make it difficult to create distortion-free scans for scan ranges larger than roughly 1 micron. In the field of scanning probe microscopes, it is desirable to accurately control both the scan size and pattern, but also to control the position relative to the sample where an image is being obtained. Deviations from linear scans make these accurate measurements difficult. The nonlinear scans also present similar problems in the use of scanning stages in other areas of application.

One possible solution to the hysteresis problem is to apply linear triangular voltage patterns to the electrodes, let the piezoelectric material scan in a non-linear manner and take Z data spaced evenly in time (but not space). After the data is recorded, the correct X, Y the positions of the Z data must be computed using calibration data for the scanner, and then the data is interpolated to construct Z(X,Y) for an equally spaced array in X and Y. This open loop scan control technique employing linear scan and image correction requires extensive calibration of the nonlinear and hysteretic behavior of each piezoelectric scanner during the manufacturing process. It is difficult to produce images in real time using this method, because many calculations are required after the data has been collected, This approach is described by Gehrtz et al in U.S. Pat. No. 5,107,113.

Barrett in U.S. Pat. No. 5,210,410 describes a related open loop method using position sensors which do not require extensive calibration of the scanner parameters. Instead, the position of the probe (or sample) is recorded from the sensor data at many points along the scan, along with the probe deflection data. Barrett describes several limitations of this method including the large amount of data which must be stored, inferior images resulting from the interpolation process, and the inability to measure very small position changes.

Elings et al in. U.S. Pat. No. 5,051,646 disclose another approach to solving the linearity problem by employing open loop scan control with a non-linear scan voltage. In this approach, nonlinear voltage patterns are applied to the electrodes to drive the piezoelectric scanner linearly with time by applying a nonlinear scan voltage. This open loop method preserves the inherent accuracy, low noise and high frequency response of the piezoelectric actuator for nanometer scale scans. For larger scans, in the 1 to 100 micron range, this approach has the difficulty of requiring detailed data concerning the behavior of each particular piezoelectric scanner, and therefore requires extensive calibration of each scanner in the manufacturing process.

Recently, several inventors have implemented closed loop scan control using position sensors that measure the motion of a piezoelectric scanner while it is scanning. Information from these position sensors is used to provide a feedback signal so that the scanners may be driven in a linear manner, with reduced effects of creep and hysteresis for scans in the 1 to 100 micron range. Alternately, the measurements from the position sensors may be used to correct data that has been acquired by an open loop scan. These sensors have been based on scanning a light pattern over a position sensitive photodiode as described in U.S. Pat. No. 5,172,002 and U.S. Pat. No. 5,196,713 by Marshall and previously by Barrett et al (Review of Scientific Instruments, Vol. 62, pp. 1393–99, June 1991) and his U.S. Pat. No. 5,210,410. In this patent Barrett clearly describes the limitations of the closed loop approach, stating ". . . for scans smaller than about 500 Angstroms the noise in the scan caused by the feedback system (dominated by the sensor noise) begins to noticeably degrade the image quality." Barrett also discusses stability problems inherent in a high gain closed loop precision motion control system.

Other position sensors have been used including optical interferometers (for example see Charette et al, Review of Scientific Instruments, Vol. 63, pp. 241–248, Jan. 1992) and capacitive sensors (Griffith et al, Journal of Vacuum Science and Technology B, Vol. 8, pp. 2023–27, Nov./Dec. 1990). In addition closed loop commercial piezoelectric scanning stages have been available since 1980 with capacitive sensors (from Queensgate), and also linear variable differential transformers (LVDTs, from Physike Instrumente). A variety of other position sensors are commercially available. In U.S. Pat. No. 4,314,174, Wing et al. describe the use of piezoelectric drive elements to dither an element in a laser gyroscope, with strain gauges being used to measure the dither and then feeding back this signal to control the drive elements, a standard closed loop control scheme.

Operation under closed loop control has been performed in the prior art in the following way. As depicted in simplified form in FIG. 1, a position sensor 40 is used to measure the instantaneous position of a scanner 30 carrying a probe tip 32 and a scan generator 10 generates a reference signal that describes the desired scan pattern. An error amplifier 12 produces an error signal proportional to the difference between the position sensor signal and the reference signal. The error signal is differentiated as indicated at 16 and integrated by integrator 14. Then the derivative, the output of the integrator, and a signal directly proportional to the error signal are summed at node 18 and directed to scanner 30. Thus the motion of the probe is under the continuous control of data from the sensor. A linear position sensor results in linear scan motion, but the inherent noise in the sensor introduces noise in the scan motion. If the sensor is non-linear, then the scan will be non-linear even under closed loop control, but could be corrected with a nonlinear reference signal.

In these closed loop systems, the scan reversal at the end of a linear scan is caused by abruptly reversing the slope of the reference signal. The sudden change in direction leads to a large error which takes time for the system to correct. The prior art control methods which rely on integration of the error signal to achieve an accurate linear scan take longer to recover control after reversal since the transient error is stored by the integral. This effect causes the motion to be non-linear at the reversals. The conventional closed loop control also fails to anticipate the special scan voltage requirements of piezoelectric transducers discussed by Elings et al in U.S. Pat. No. 5,051,644. In the closed loop system the appropriate transducer scan voltage is only generated after position errors exist and have been detected by the sensor. Typically, the error signal is electronically integrated to generate the scan voltage pattern. For a raster scan pattern, this same process is duplicated in both the scan axes. In the prior art, the type of feedback is fixed during manufacture and independent of scan parameters.

Unfortunately, it is difficult to find a sensor that matches well the operating dynamic range and bandwidth requirements of many piezoelectric scanners. Piezoelectric scanners used in scanning probe microscopes may have scan ranges of more than a hundred microns, yet need to be able to resolve detail on the subnanometer-scale. For scanning probe microscopes it is often desirable to operate with a dynamic range of about $10^6$ and a bandwidth of greater than 1 kHz.

While position sensors used in the prior art work acceptably for large scale scans, most do not have sufficient resolution to control accurately scans on the nanometer scale. Commercially available piezoelectric scanners with capacitive sensors or LVDTs have a quoted resolution of around 1–10 nm in the bandwidth required. Since atomic scale scans may be only 1 nm square, this resolution is clearly inadequate. If the system is operated with feedback for such small scans, the noise from the sensor will be introduced into the scan pattern of the scanning probe microscope and hence into the images. Using the prior art feedback systems, the only way to reduce the influence of the sensor noise on the scanning system is to reduce the speed of the feedback loop. This limits either the speed or the accuracy with which the scanner can be moved. Unfortunately for scanning probe microscopes, most users wish to speed up the scan for the small scans to reduce the effect of 1/f noise in the probe detection electronics and to minimize the effect of mechanical drift and transducer creep. So the requirements do not match the prior art approaches.

In the few cases where sensors can be optimized to provide subnanometer resolution, the sensors usually lack the dynamic range to also measure motions on the 100-micron scale. Optical interferometers are a very appealing sensor for a scan control system since they are self calibrating based on the wavelength of light used. Also, since the output is periodic, they have potentially infinite dynamic range (the sensor can measure infinitely large position shifts by counting an arbitrarily high number of periods). The periodicity is some fraction of the wavelength of light, typically a few hundred nanometers. Since scanning probe microscopes and other modern scanning systems require motions on a much smaller scale, it has been insufficient in the prior art to simply count successive periods.

This has been solved in the prior art by interpolating the periodic signal to measure displacement smaller than the fundamental period. Commercial interferometers are available from Zygo Corporation and Hewlett-Packard among others that claim a resolution of around 1 nm. To be successful, this type of interpolation requires extreme care in the construction of an optical system. These complex devices are very expensive and are not easily adapted to scanning systems such as scanning probe microscopes.

Potentially useful position sensors such as capacitive sensors may have an accurately known response function that is highly non-linear. Such sensors can not be used directly in conventional control systems without some form of linearization. Both sensors and transducers may mix motion in X, Y, and Z. Obtaining pure single axis motion may require scan voltages on all three transducers. Sensing a pure single axis position may require data from all three sensors. Such undesirable crosstalk adds to the difficulty of conventional feedback control systems.

In the prior art, one commercial solution to the problem of a noisy position sensor has been to turn off the scan feedback control when the scan size was reduced below the effective measurement range of the sensor, i.e. for scan sizes below about 2 microns. There are serious drawbacks to turning the feedback off. First, there is no longer any control over the scan size. In addition, the transition between so-called closed-loop (feedback on) and open-loop (feedback off), may result in an offset in the position of the scanner. This can make it difficult to localize and then "zoom in" on an object of interest in a scanning probe microscope. Another disadvantage to turning the feedback off at small scans is that there is no longer any correction for "creep." "Creep" and other forms of drift are perhaps the largest source of distortions at small scan sizes, so turning off the feedback altogether is an unattractive alternative.

SUMMARY OF THE INVENTION

Accordingly one object of the present invention is to provide a novel scan control method and system capable of controlling the motion of a scanning probe microscope over a wide dynamic range.

Another object of this invention is to provide a new and improved scan control method and system characterized by the small scale scan accuracy and high speed capability of open loop control and which adjusts for drift and scanner sensitivity.

Yet another object of this invention is to provide a new and improved scan control method and system characterized by the large scale amplitude linearity and stable position control of closed loop control and which avoids the problem of sensor noise at small scans.

Still a further object of this invention is to provide a novel method and system of scan control in which position errors during scan reversals are reduced relative to closed loop systems.

These and other objects are achieved according to the present invention by providing a new and improved scan control method, including generating a scan voltage which varies as a parametric function of time or probe position; applying the scan voltage to the scanner; sensing plural positions of the scanner upon application of the scan voltage; and controlling at least one parameter of the parametric function defining the scan voltage based on the sensed scanner positions.

In one embodiment of the method of the invention, a polynomial is selected as the parametric function defining the scan voltage, and the order of terms of the polynomial is set in relation to the size of the scan being controlled, with at least one order term being set for small scans and plural order terms being set for relatively larger scans.

Accordingly, the present invention uses sensed position data not to control the motion of the scanner directly as in prior art systems, but instead to optimize the transducer parameters for subsequent open loop scan control of a selected interval within the raster scan, such as a line scan, portion of a line scan, or even an entire image. For some parameters this optimization occurs before image generation begins, or in the course of image generation with a conventional raster scan with repeated X motion superimposed on gradual Y motion. In a large slow scan, position data from each X excursion can be used to adjust the parameters for the next X excursion or for the X excursions in future image scans; and Y parameters can be updated repeatedly as the Y scan proceeds. For small fast scans, it may be sufficient to optimize transducer parameters after collecting an entire image. It may also be desirable, except for drift, to change the scan voltage parameters only at the beginning of a new image in order to avoid any discontinuities in the image, even though enough data is taken on a single X scan to optimize the next X scan.

In addition to the time required to complete the scan and the linear dimensions of the scan, the optimum method of updating parameters will depend on the noise level and noise spectrum of the sensor. In contrast to prior art closed loop systems where point by point control introduces sensor noise at each correction, the present invention uses a scan voltage determined by a mathematically generated scan pattern and transducer parameters stored in memory, so the sensor does not continuously inject noise into the scanner motion. In some cases the parameters may be determined and then held constant while an entire scan is completed under open loop control. In other cases the initially determined parameters can be corrected by iteratively optimizing the transducer parameters to compensate for small changes due to sensor errors, as described below in relation to FIG. 3. Thus, this invention is characterized by the control of scanner motion provided by prior art closed loop systems while, at the same time, retaining the speed, low noise, and wide dynamic range advantages of the open loop scan control.

Unlike the prior art open loop control systems which relied on the transducer parameters determined during manufacture, perhaps years before the scan is carried out, sensed position data from as little as a few tenths of seconds earlier can be used to adjust transducer parameters for the effects of scan motion (hysteresis), temperature changes, creep, aging, etc. Thus, the present invention provides a mechanism for controlling drift, which is a function of the previous motion of the scanner, which is impossible to achieve with conventional open loop systems. Further, because the scan voltages are generated from stored parameters in this invention, they provide instantly the waveforms required during scan reversal to minimize position errors, instead of waiting for error signals as in the prior art inventions. The method of the invention determines the waveform required during scan reversal from previous data in order to produce a linear scan with little error.

The preferred embodiment would then gradually increase the number of parameters that are updated as scan size is increased and the sensor signal-to-noise ratio becomes larger. At small scans during which scanner position typically changes linearly with scan voltage, the sensor can be used to determine only one or two parameters, the average scan position and the scan size. At slightly larger scans one or two additional parameters are used to introduce small non-linear corrections in the scan voltage. For large scans where the scanner is ill behaved but the position sensor information is relatively good, many parameters are used. In addition, by updating the parameters for large scans, the improved method achieves the same linear scan accuracy as the prior art closed loop control systems, with the added advantage of improved accuracy during scan reversal because the scan voltage waveform parameters are adjusted to optimize the scan reversal and reduce the turnaround transient error generated by prior art closed loop control systems.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The invention is a method of controlling a scanner using a parametric scan voltage waveform whose parameters are updated using a motion sensor to sense plural scanner positions which are compared to the desired scanner motion and used to vary the scan voltage parameters to maintain the scan linear and free of drift and creep. The method implemented uses a high speed digital computer to process the position data according to a single numerical algorithm, or a set of related algorithms which share data in a digital memory, including the steps of: calculating the parameters of a position function describing the scanner motion, comparing the position function parameters with values set by the operator and stored in memory to obtain a measure of the error in the scan, and adjusting another set of parameters defining the scan voltage according to the measured scan error in order to cause the scanner to deflect linearly with time and to compensate for scanner drift and creep. This is in contrast to the conventional feedback scan controller of FIG. 1 where the sensor position signal is continuously monitored and the scanner correspondingly continuously controlled on a point by point basis. Because existing position sensors are incapable of supplying readings on the angstrom scale without a few nanometers of noise, atomic resolution scans are out of the question when done using conventional feedback scan control. With the present invention, on the other hand, the scan voltage is predetermined and updated based on data over many data points so that scanner control is not affected by sensor noise and smooth noise free scans can be made at high rates of speed.

Figure 2:
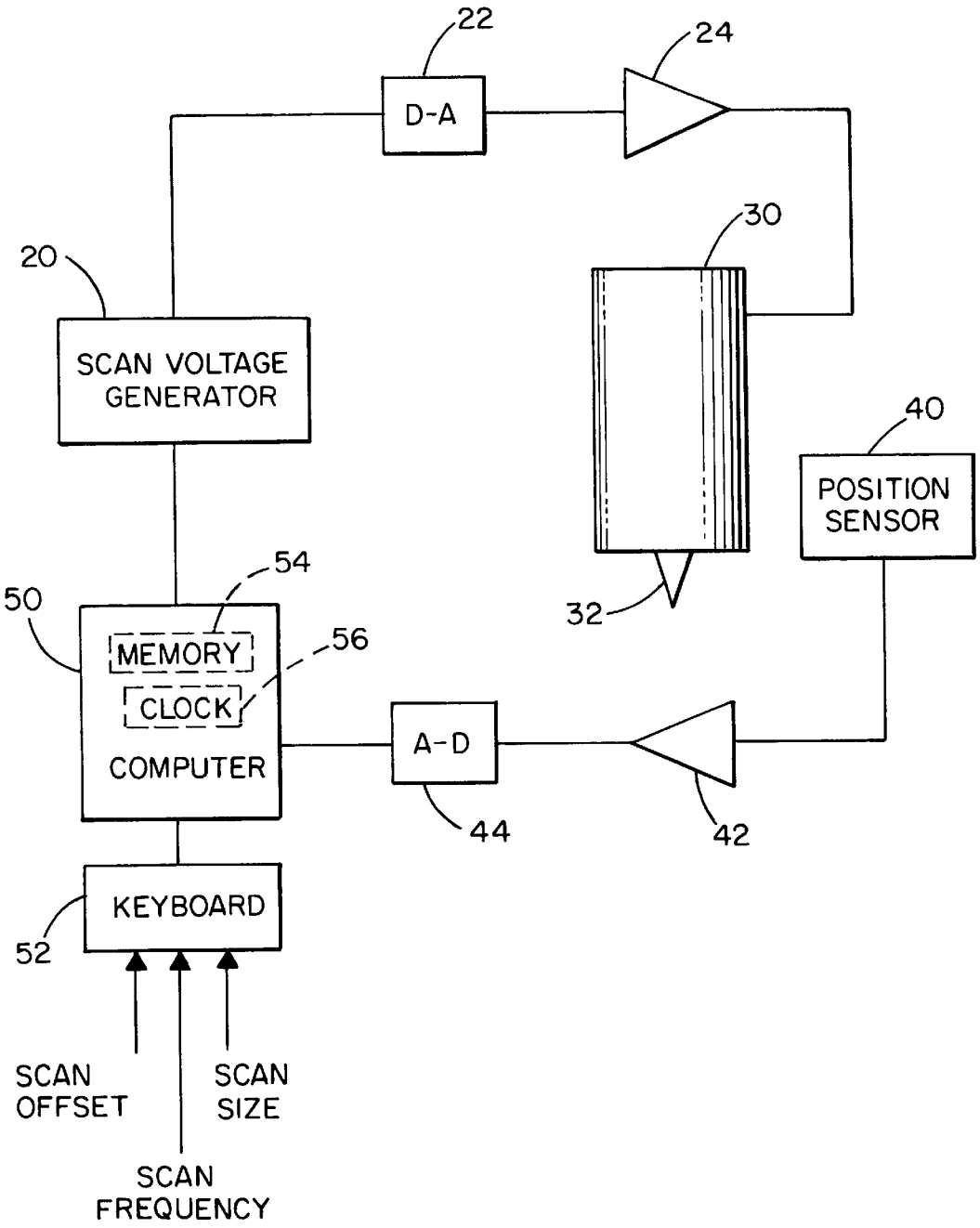
FIG. 2 is a schematic block diagram of a system implementing the scan control of the present invention according to a preferred embodiment.

Referring now to the other drawings, wherein like reference numerals designate identical or corresponding parts throughout the several views, and more particularly to FIG. 2 thereof, a preferred embodiment of the present invention for controlling the scanner line scan in the X-direction is shown. In FIG. 2, a scan voltage generator 20 generates a scan voltage waveform in terms of a parametric function of time, scanner position, or some other parameter or combination of parameters (time and position for example) and through a digital-to-analog (D-A) converter 22 applies the scan voltage waveform to an X-axis driver 24. Driver 24 then applies the parameterized scan voltage waveform to the X-axis drive electrodes of scanner 30, shown carrying probe tip 32 although scanner 30 can be used to drive either the sample or the probe in an X-direction line scan. Scanner 30 typically is a piezoelectric transducer, but can be any of a number of other scanning devices, such as a magnetostrictive device, an electrostrictive device or a transducer operated by magnetic forces, as in an electric motor or solenoid. Motion of scanner 30 in the X-direction is sensed by an external motion sensor 40, which is implemented conventionally by means of an optical interferometer, a capacitive sensor, an LVDT, an optical lever beam deflection sensor, an optical blade, a laser diode with a moveable reflector which undergoes periodic changes in power output as the position of the reflector changes, etc. The sensor signal is directed through an amplifier 42 and an analog-to-digital (A-D) converter 44 to a computer 50 having a memory 54 and a clock 56. Computer 50 takes as input the position data from sensor 40, the scan size, scan offset and scan frequency entered by the operator via a keyboard 52, and uses this data to update the parameters of scan voltage generator 20 so as to vary the scan voltage waveform to achieve a change in the scanning motion of the scanner. In one implementation computer 50 fits a parametric function of time to the scanner position data using, for example, the method of least squares as discussed in R. Sedgewick, Algorithms, Addison-Wesley, Inc., Reading, Mass., 19—, p. 73. These scanner position parameters are then used to update the parameters of scan voltage generator 20.

Figure 3:
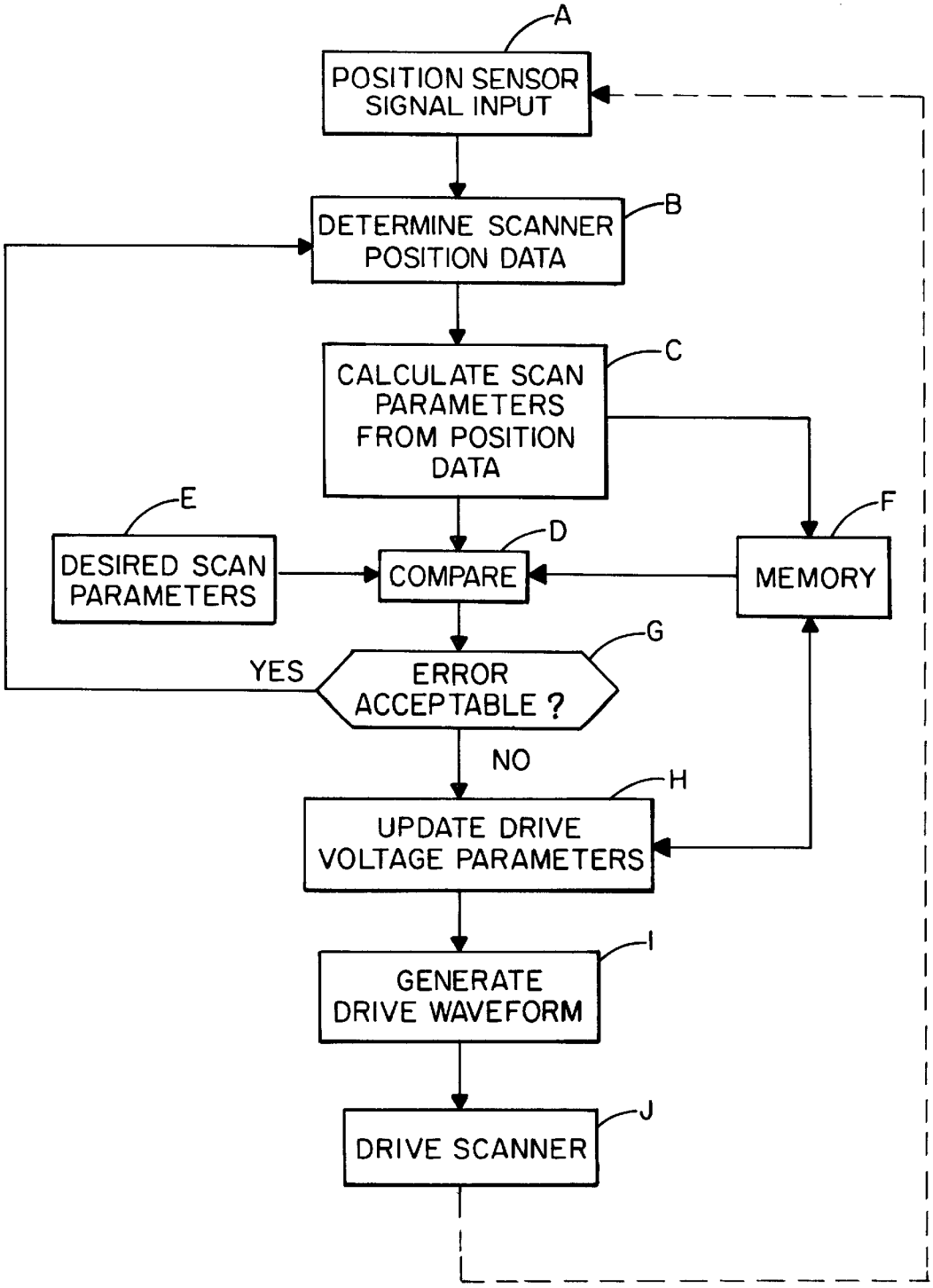
FIG. 3 is a schematic block diagram of one version of the parameter update generator shown in FIG. 2.

FIG. 3 shows a flow chart of the basic functions performed by the scanner control algorithm according to a preferred embodiment of the present invention. In step B the scanner position data are determined from the position sensor input signal (step A) and in step C a curve is fitted to the position data to generate the coefficients of the scanner position polynomial. The difference between the measured parametric coefficients such as scan size, scan position, and linearity, the desired coefficients set by the operator (step E), and the previously measured coefficients stored in memory (step F) is calculated in step D to estimate the error in the scan. In the next step, (step G), the scan error is compared to the acceptable error for a given scan size which can be selected by the operator according to sample requirements. When the magnitude of the error in the scan is determined in step G to be sufficiently large, the parametric coefficients of the scan voltage are updated in step H using, for example, a look-up table stored in memory (step F) which relates scanner position parameters to scan voltage parameters. As described below for the case of large scan sizes, the look-up table used to update the scan voltage parameters and, stored in memory (step F) could be determined by a factory pre-calibration procedure, be derived from a calibration procedure run just before scanning an image, or be generated empirically by iteratively testing until a satisfactory linear scan is obtained. The scan voltage parameters are used to generate a scan voltage waveform (step I) which is applied to the scanner (step J). On the other hand, if the magnitude of the error in the scan is acceptable, the scan voltage parameters are left unchanged until additional scanner position data are obtained.

Figure 4:
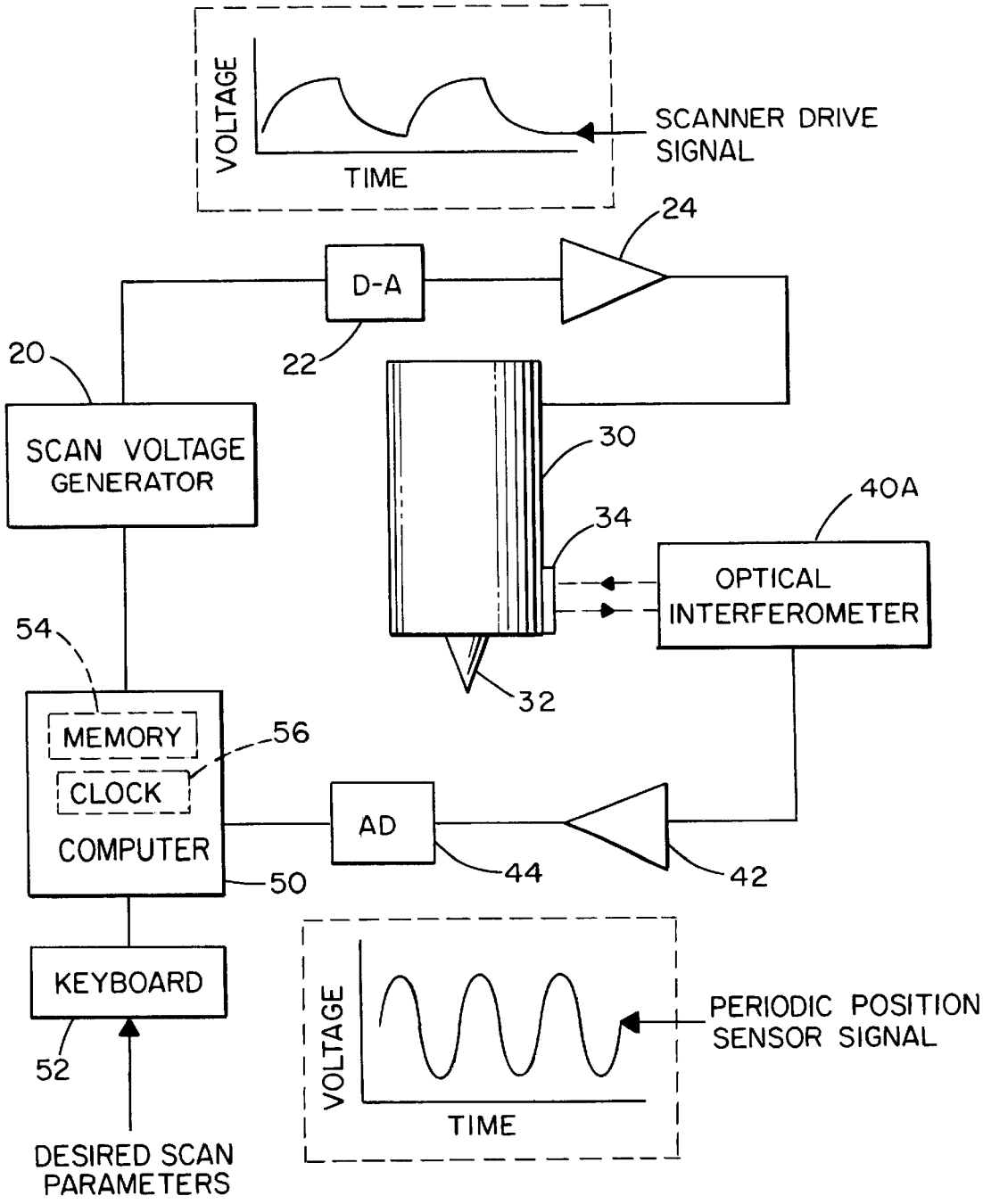
FIG. 4 is a schematic block diagram of a system implementing the scan control of the present invention using a periodic motion sensor showing how the output of the periodic sensor is processed by the scan controller.

FIG. 4 presents an alternate embodiment of the invention in which an optical interferometer 40A produces a signal that varies periodically with scanner position. As mentioned in the background of the invention, optical interferometers can have resolution of around 1 nm, but only accompanied by great complexity and substantial cost. Extremely simple optical interferometers have been constructed, however, that consist of a single laser diode. Because the commercial laser diodes contain an integral photodiode, it is possible to construct a low cost interferometer by reflecting the laser diode's beam off a moving part (shown in FIG. 4 as a reflective element 34) back into the laser itself. This type of interferometer has been used successfully to detect the cantilever displacement in an atomic force microscope, as described by Elings et al in U.S. Pat. No. 5,025,658. Since this design lacks the optical complexity of commercial optical interferometers, its periodic output is not sinusoidal enough to be interpolated with high accuracy. It does, however, produce an output that is periodic with a distance fixed by the laser wavelength so that position data can be obtained from the position of the peaks, valleys, and/or points of steepest slope of the output signal. The period depends on the specific laser used, but is typically a few hundred nanometers, however the positions of peaks, valleys, or points of steepest slope can be determined to a small fraction of the period.

As discussed below, in the case of small scans where few periods of the detector are measured, few scan parameters can be calculated, but this is sufficient since the scanners are fairly linear at small scans and only a few parameters are required in the parameterized scan voltage. In particular, with 1 sensor peak per scan line the peak position determines the scan offset. Adjusting the scan voltage to keep this peak in the same position is sufficient to compensate for drift from scan line to scan line. For scans with 2 peaks per scan line, or one peak and a valley, the position data points determine a scan size so that both the scan offset and scan size can be calculated. Notice that in the prior art, using such a detector would not work without electronics to turn the periodic signal into a linear signal to be compared with a reference signal, to control the scanner at every point along the scan.

Another approach for small scans where very few peaks are obtained from the interferometer is to store the sensor waveform during a scan and then compare waveforms from subsequent scans by cross correlation. The offset in the peak of the cross correlation function gives the magnitude and direction of the drift. This technique could be used for any scan direction and is described in U.S. Pat. No. 5,077,473 by V. Elings et al. Although this method is more computationally intensive than the previously described preferred embodiment, this method could be used to compensate for drift at small scan sizes even without a peak or a valley in the interferometer signal.

Figure 5:
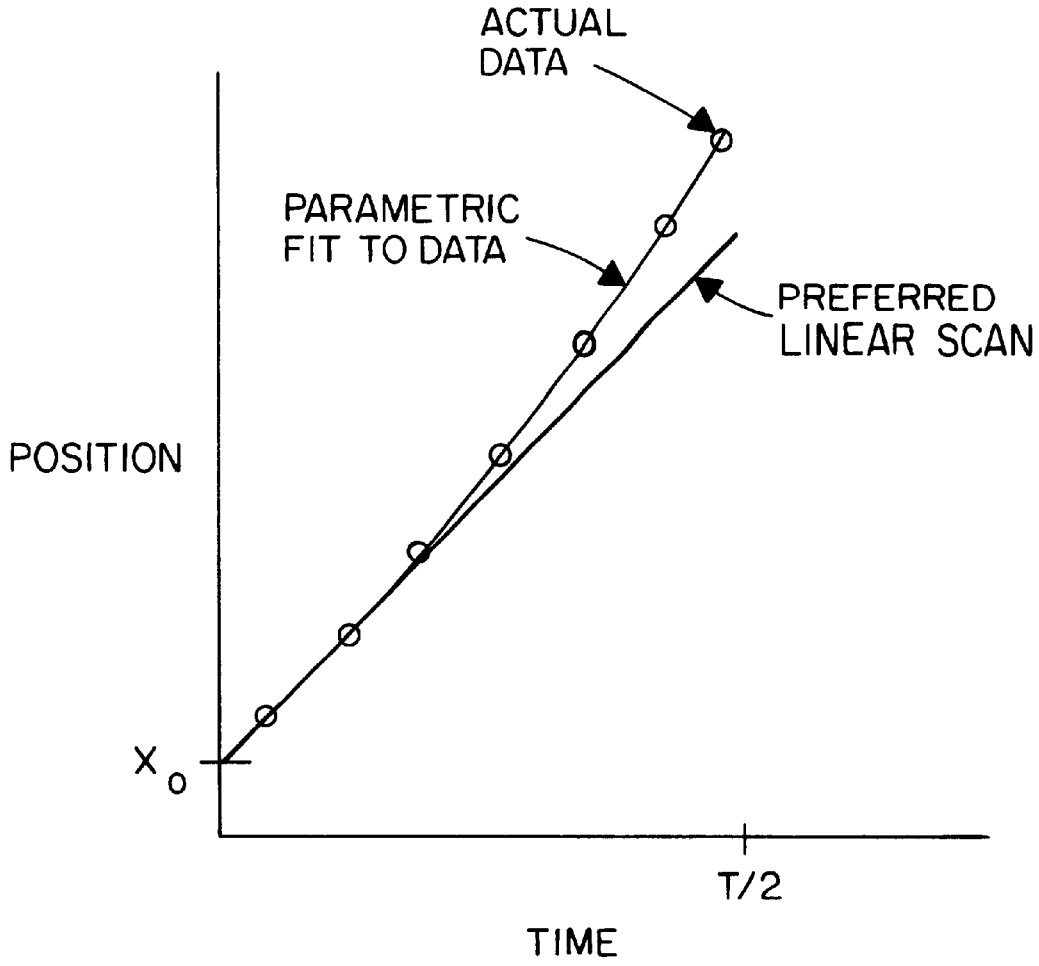
FIG. 5 is a simplified graph depicting the actual sensor position data and the desired linear scan.

In FIG. 5 is shown the number of sensor peaks measured as a function of time during one half cycle of an X-scan where the scan is large enough to give several peaks from the interferometer. The scan offset $X_o$ is labeled and the data are fit with a parametric function which shows that the scan is nonlinear and the scan speed (slope of the line) increases during the scan so that the measured scan size, $X_s$ is larger than the desired scan size. The parameters of the scan voltage waveform would be adjusted so that the peak positions would be equally spaced with the proper spacing in order to obtain the preferred linear scan.

The periodic sensor complements the properties of the scanners in that for small scans where the scanner response is linear the sensor provides only a few peaks and one can determine only a few parameters, but for large scans, where the scanner is non-linear, one can determine many parameters because many peaks from the sensor are measured. Thus, the parameter optimization method of this invention provides a good match between the inexpensive periodic sensor and the piezoelectric scanner so that both small and large scans can be performed accurately and in a linear manner, at high speed, and with minimal noise.

DETAILED DESCRIPTION OF THE PREFERRED EMBODIMENT

In the preferred embodiment, at a predetermined time, such as at the end of each scan line or after several scan lines, scanner position parameters are calculated by a least-squares fit to the sensor position data using a polynomial of the following form:

$$X_m(t) = X_o + X(t - T_m) + A(t - T_m)^2 + B(t - T_m)^3 + \quad (1)$$

where $$X(t) = \begin{cases} 2X_s \frac{t}{T} & 0 \leqq t \leqq \frac{T}{2} \\ 2X_s\left(1 - \frac{t}{T}\right) & \frac{T}{2} \leqq t \leqq T \end{cases} \quad (2)$$

and $X_o$ is the scan offset, $X_s$ is scan size, A,B etc. are coefficients which go to zero in the case of the desired linear X-scanning motion, T is the time for one cycle (trace and retrace) along the fast scan (x)-axis and $T_m$=mT for m=0,1, . . . ,M, the total number of scan lines. The number of parameters calculated from the position data varies with the scan size and may decrease as the scan size decreases for the typical case where scanner linearity improves for smaller scans. Large scans, where the scanner is very non-linear and many parameters are necessary to describe a scan voltage waveform which will produce a linear line scan, are accommodated because there is relatively little noise in the position sensor signal compared with the range of motion and therefore position sensor 40 is able to produce enough data to generate many parameters.

On the other hand, small scans are accommodated because at small scans the scanner is more linear and fewer parameters are needed, while the sensor signal is relatively more noisy (the signal is less because of the smaller scan, hence signal/noise goes down) and fewer parameters can now be well defined.

For piezoelectric scanners which become linear at small scans the exact number of parameters dropped for a particular line scan size depends on the piezoelectric material, and can be determined by running a series of scans, and allowing the computations system to decide, for a given level of accuracy, how many parameters are needed to produce linear scans at different scan sizes. This information then becomes part of the scan algorithm, and need probably be done only once. Typically, for a 1% accuracy and for the indicated scan size, the following number of parameters are desired:

| Scan Size ($\mu$m) | # of Parameters |
|---|---|
| 100 | 10 |
| 75 | 10 |
| 50 | 8 |
| 25 | 6 |
| 12 | 5 |
| 6 | 4 |
| 2 | 3 |
| 1 | 3 |
| .1 | 2 |
| .05 | 1 |

In the limit of small scan sizes, only one parameter is updated to control the drift, which is something that cannot be programmed into the prior art open loop scheme since the drift is not predictable. In this one parameter case, all N sensor position data ($X_i$, $t_i$) from one line could be used to generate one parameter, the average scan position given by:

$$\overline{X} = \frac{1}{N}\sum_{i=1}^{N} X_i \tag{3}$$

for each scan line. This information can be used in the computer 50 to calculate scan parameters which will keep $\overline{X}$ equal to the desired value $X_o+X_s/2$ and constant with time (no drift). For a two parameter fit, one could make a least squares fit of $X_i$ with a straight line, which would give data on both the average scan positions and the scan size. Piezoelectric scanners sometimes have a problem that at a fixed scan voltage, the scan size varies with scan offset $X_o$. A 2 parameter fit to the position data to determine the scan size would allow for adjusting the scan voltage to compensate of this problem of offset-dependent sensitivity.

For a linear scan, the scan error is simply given by the difference between the measured scan size and scan offset and the operator selected values. In addition, the magnitude of the higher order non-linear coefficients of the position function determined by a second or higher order least squares fit, eqn. (1), gives the error due to scanner nonlinearity; for example, the quadratic error in the scan can be defined as the ratio of the second-order coefficient of the fit to the position data, A, to the entire scan size. This error can be used to determine new values for the higher order coefficients of the scan voltage waveform, as described below. The scan parameters are also stored in memory (step F) and compared with previous values so that parameters which are drifting predictably can be extrapolated in time to provide the best possible estimate of their value, or to include their drift in the scan voltage wave form.

In an alternate embodiment, another measure of the error in the scan can be obtained by programming the computer to determine the square of the differences between the data for the two scan directions, +X and −X. The correct nonlinear driving waveform can be determined by adjusting the scan voltage parameters until the data taken in the two directions agree. This will occur only when the scan in each direction is linear.

The nonlinear parametric scan voltage waveform can be made in the form of increments $\Delta V(t)=C(1+f(t))$ where f(t) is a monotonically decreasing function of t, as described in U.S. Pat. No. 5,051,646 by Elings and Gurley. A function of the above form can be calculated quickly in real time, requiring only three adds per point. In general, the scan voltage waveform can be represented by:

$$V(t)=a+bt+ct^2+dt^3 \tag{4}$$

where a, b, c . . . are the parameters updated in step H.

Next discussed in more detail are examples of the scan control algorithm for the case of small, medium and large scan sizes.

A. Parameters for Small Scans

At small scans, such as below one micron, only a few scan voltage parameters can be determined from the sensor data, but since the scanners are quite linear, only a few scan voltage parameters are needed. At the very least, the average position measurement for successive scan lines can be used to determine the drift and, as described below, when using an optical interferometer as the motion sensor the drift can be controlled even when the scan is not large enough to include one peak. In fact, usually only two scan control parameters, the scan offset and the scan size, are needed to determine a scan voltage waveform which will compensate for scanner drift, creep and sensitivity changes without introducing noise from the sensor into the scan pattern. During a small linear scan the position data points for one scan line, $X_i$, measured by sensor 40 can be fit by a straight line using, for example, the method of least squares to determine the offset position $X_o$ for each scanline and the scan size $X_s$ or scan velocity (since scan size equals scan velocity multiplied by scan time). Even if the sensor measures several hundred data points on each scan line, only two parameters $X_o$ and $X_s$ need be calculated on each line or fraction of a line. The measured parameters are then compared to the desired scan parameters to determine an error and, if the error is sufficiently large, the scan voltage parameters can be updated to correct the scan and maintain the scan offset and scan size parameters at the values selected by the operator. For an essentially linear piezoelectric scanning element with sensitivity $\alpha$, the scan voltage in one approach is given by $$V(t)=X(t)/\alpha+V_o \tag{5}$$

where X(t) is given by eqn. (1) and the scan offset voltage $V_o$ is updated periodically to compensate for the slowly varying drift. $\alpha$ can be obtained from precalibration or can be updated from the sensor scan size Xs.

One can make the drift correction to the scan voltage continuous rather than periodic. In this case the smoothly varying drift velocity canceling signal would add almost no distortion or noise to the image. The scan voltage waveform can then be of the form, $$V(t)=a+bt+X(t)/\alpha \tag{6}$$

Here Vo has been broken into two parts, a constant and a linear ramp bt, correcting for drift. After several iterations of the feedback loop the scan parameters stored in memory can be used to determine the scanner drift. Once the drift is known it becomes part of the scan so that the scan voltage as shown in eqn. (6) would be a triangle waveform with a ramp superimposed to cancel the drift, and thus the drift would be canceled at each point in the scan.

In an alternative embodiment to control creep, the time interval between scan voltage parameter updates can be increased when compensating for slow drift at small scan sizes so that the updates are made after an entire image has been scanned in order to maintain an average position and/or scan size for the whole image, and thus most of the raster scan is carried out in essentially open loop fashion. This approach also averages the sensor noise over a much longer time so the noise is reduced even more.

The method of the invention works even if the scanner is non-linear at small scans—one simply updates as many parameters as possible from the sensor data and the other parameters come from precalibration as is now done with conventional open loop systems. In this case scan voltage generator 20 produces, e.g., a scan voltage waveform V(t), for one half-cycle of the X scan given by:

$$V(t)=a+bt+c_o t^2+d_o t^3+ \quad (7)$$

where $c_o$ and $d_o$ come from previous data, such as factory calibrations, and are not adjusted and a and b are adjusted so that in the fit to the sensor data given by eqns. (1) and (2), $X_o$ and $X_s$ (the scan offset and scan size) are kept at user selected values by adjusting a and b. Again, the invention at small scan sizes reduces the very noisy sensor data points to one or two noise free parameters used to determine the scan voltage, to produce scans of high quality and at high scan speed.

B. Parameters for Medium Scans

Over medium scan distances of a few microns the non-linearity of the piezoelectric scanner begins to become evident. However a small quadratic correction term provides the needed correction and the scanning voltage Vm(t) then becomes:

$$V_m(t)=a+bt+ct^2+X(t)/\alpha \quad (8)$$

to give the desired linear scan motion a and b are used to determine the scan position and compensate for drift as in the case of small scans, and the quadratic term, c, can come from previous data, such as factory calibrations, or can be determined from the non-linear coefficient of the measured scanner position function X(t).

The measured position data is used to determine three parameters (or a few more), but not several hundred, because the signal to noise in the sensors is not that good for medium scans.

C. Parameters for Large Scans

Scans over large areas may involve large errors due to scanner non-linearities and require more parameters in the scanning voltage. At the same time, the signal to noise ratio of the position sensor has improved and more parameters can be determined. According to one embodiment of the invention using a periodic sensor, the corresponding parameters of the scan voltage waveform, eqn. (1), are adjusted using a look-up table until the sensor peaks occur at the proper equally spaced intervals, indicating a linear scan of the correct magnitude and position. One approach is to maintain complete tables of scan voltage, $V(t_n)$ and scan position, $X(t_n)$, as a function of time, $t_n$, during the scan, where $t_n$ is the time associated with the nth point in the scan. These tables may contain hundreds, or even thousands of entries to completely specify the scan voltage and position response. A look-up table relating the parameters of the scanner position function and the scan voltage function can be generated by a precalibration procedure in which the nonlinear waveform used to drive scanner 30 is determined by using the particular scanner being calibrated to scan a probe over a calibrated surface, such as a diffraction grating (at large scans), or an atomic crystal (at small scans) using a known waveform such as a triangular waveform, and then measuring the resulting nonlinear image collected to work backwards and determine the driving waveform needed to produce a linear image. In another approach the initial scan table would be just a linear voltage scan based on the small scan parameters, and as the scan continues, the sensor data are used to adjust the scan voltage parameters to improve the scanner linearity, iterating until a satisfactory linear scan is obtained. This table could be saved as a starting point for future scans.

Figure 1:
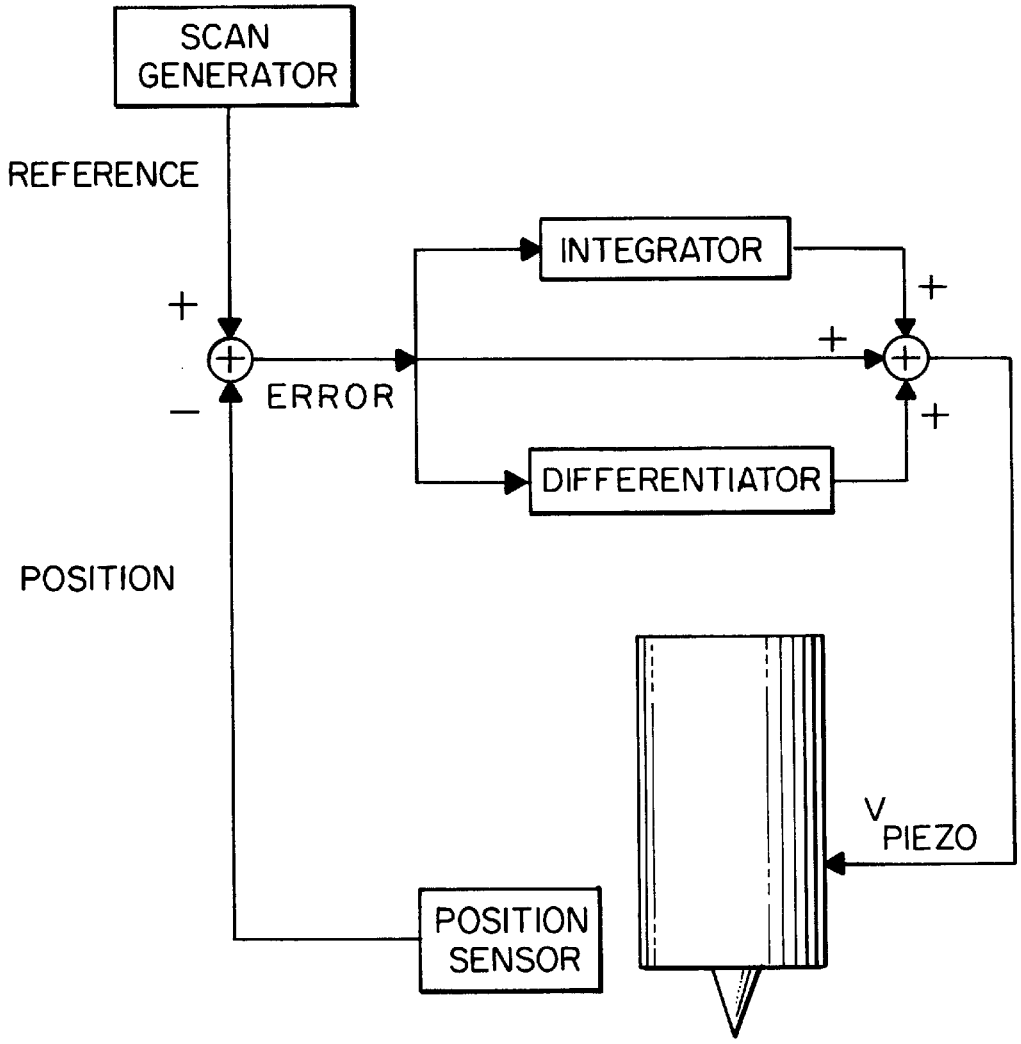
FIG. 1 PRIOR ART
FIG. 1 is a schematic of prior art closed loop control systems.

This invention also optimizes the position control at the ends of the scan line because the scan reversal generated by the scan voltage waveform is applied directly to the scanner. In prior art closed loop systems, as shown in FIG. 1, the slope of the reference signal changes sign to indicate that a change in direction of the scan is desired. The difference between the measured scanner position and the reference signal generates an error signal which is used to correct the scan voltage. The problem is that at fast scan speeds, and especially with noise filtering on the sensor signal, a large error voltage can occur before the scan voltage changes enough to reverse the scan. A larger error voltage generates a turnaround transient and results in a significant scan error. In this invention the scan reversal, as expressed in the parametric scan voltage, is applied directly to the scanner, with no time delay between the reference signal and the scanner response so the scanner direction can be changed quickly without the creation of a large error signal as is the case with the system of FIG. 1. For example, in the case of small scans where the scanner response is linear, a simple triangle scan voltage waveform applied directly to the scanner eliminates the turnaround transient of the prior art closed loop system. This feature of the invention is also important at higher scan rates where filtered error signals would create a long delay between the change in direction of the reference signal and the scanner response, leading to a large turnaround transient and a very non-linear scan.

During the time the many X scans are carried out at high speed the Y motion slowly continues, and so the Y sensor signal can be averaged to eliminate noise, providing the needed information to control drift and other errors in the Y motion. Controlling scanner motion along the Y-axis at small scan sizes where the scan rate is fast can be accomplished by collecting frames of data to determine the scan offset $Y_o$ and scan size $Y_s$. Drifts in these parameters can be controlled according to the previously described X-scan control algorithm. At large scan sizes there is enough position data available to correct each step in Y, though X axis motion is carried out under parametric control with a few non-linear parameters to optimize the scan. It should be noted that the sensors on the X and Y axis do not need to be the same type; for example, one could use a capacitive sensor on one axis and an optical sensor on the other.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. In a method of controlling a scanning motion for a scanning probe microscope with a scanner having an attached end and a free end in which positioning of the free end is controlled by application of a scan voltage to the scanner, the improvement comprising the steps of:

a) applying to said scanner a scan voltage which varies as a predetermined parametric function to generate a scanning motion;

b) monitoring said scanning motion with a position sensor by sensing plural position data of said free end along a selected coordinate; and c) updating parameters of said predetermined parametric function based on the sensed plural position data to produce a linear scan of certain size and offset.

2. The method of claim 1 further comprising the step of:

selecting the number of parameters which are updated in relation to decreasing position sensor signal-to-noise ratio.

3. The method of claim 1, comprising:

selecting a scanner which includes materials selected from the group consisting of piezoelectrics or electrostrictives.

4. The method of claim 1, wherein said step of monitoring the scanning motion includes the step of:

sensing plural position data with a position sensor selected from the group consisting of optical interferometers and capacitive sensors.

5. The method of claim 1, wherein said step of applying said scan voltage comprises the step of:

choosing as said parametric function a nonlinear waveform V(t), given by:

$$V(t)=a+bt+ct^2+dt^3 \ldots$$

where a, b, c . . . are adjustable parameters and t is the time along a scan line.

6. The method of claim 1, wherein said step of monitoring said scanning movement includes the step of:

calculating from said position data parameters of a position function describing said scanning movement; and storing the position function parameters in a memory.

7. The method of claim 6 wherein said step of controlling a parameter of said scan voltage parametric function includes the step of:

comparing said position function parameters to desired scan parameters set by an operator; and, compensating for any difference between said position function parameters and said desired scan parameters by adjusting the parameters of said scan voltage.

8. The method of claim 6, wherein said step of calculating the parameters of a position includes the step of:

determining the parameters of a general position function by a least-squares fit of a polynomial of a predetermined order to the motion sensor position data.

9. The method of claim 8 wherein said step of calculating the parameters of a polynomial position function includes the step of:

selecting the order of the terms of the polynomial in relation to the size of the scanning motion with at least a first order term being determined for small scans and plural order terms being determined for larger scans.

10. The method of claim 5, wherein the higher order coefficients of said nonlinear waveform are fixed at predetermined values while the lower order parameters are adjusted to control scanner motion.

11. The method of claim 1, wherein said step of monitoring said scanning movement includes the step of:

collecting image data at the time of said sensing of scanner position data.

12. The method of claim 1, wherein said step of applying a scan voltage to the scanner includes the step of:

calculating a voltage increment to be added to said scan voltage at least twice during scanning.

13. The method of claim 1 wherein said step of updating the parameters of the scan voltage parametric function includes at least one of the steps of:

updating the parameters of said scan voltage parametric function prior to scanning an image;

updating the parameters of said scan voltage parametric function at selected intervals within a scan;

updating the parameters of said scan voltage parametric function iteratively;

updating the parameters of said scan voltage parametric function based on the scan voltage function parameters stored in a memory; and continuously updating the parameters of said scan voltage parametric function while scanning an image by extrapolating from parameter values obtained from previous scans.

14. The method of claim 6 wherein said step of monitoring said scanning movement includes the step of:

calculating the parameters of a position function from the data for the forward scan direction and from the data for the backward scan direction.

15. The method of claim 1, wherein said step of monitoring said scanning movement includes the step of:

sensing plural position data with an optical interferometer having a periodic output.

16. The method of claim 15, wherein said step of updating the parameters of said scan voltage parametric function includes the step of:

adjusting the parameters of the scan voltage parametric function until the differences between the parameters of the position function for the forward scan direction and the parameters of the position function for the backward scan direction are minimized, whereby parameters of the scan voltage parametric function are established to compensate for the nonlinearity of the piezoelectric scanner.

17. The method of claim 15 wherein said step of sensing plural position data with an optical interferometer includes the step of:

storing in a memory during a scan a motion sensor waveform from the optical interferometer; and comparing the motion sensor waveforms from subsequent scans by cross correlation.

18. The method of claim 1, wherein scanning is performed along two, generally orthogonal axes, and said monitoring step includes sensing plural position data along both of said axes, and said controlling step controls scanning motion along both of said axes.

19. In a method of controlling a scanning motion for a scanning probe microscope with a scanner having an attached end and a free end in which positioning of the free end is controlled by application of a scan voltage to the scanner, the improvement comprising the steps of:

a) applying to said scanner a scan voltage which varies as a predetermined parametric function to generate a scanning motion;

b) monitoring said scanning motion with a position sensor by sensing plural position data of said free end along a selected coordinate;

c) calculating parameters of a scan position function from the scanner position data;

d) storing the parameters of said scan position function in a memory;

e) comparing the scan position function parameters with parameters set by an operator and parameters stored in the memory to obtain a measure of the error in the scan; and f) using a look-up table relating the measured error in the scan to the scan voltage parameters to adjust the scan voltage parameters in order to reduce the error in the scan.

20. The method of claim 19, wherein said look-up table relating the error in the scan to the adjustable scan voltage parameters is obtained by a precalibration procedure including the steps of:

a) driving the scanner with a waveform determined by the scan voltage parametric function to scan a known subject surface containing a distance calibration marking and produce scanner position data regarding the characteristics of said known subject surface;

b) calculating parameters of a scan position function from the scanner position data;

c) comparing the scan position function parameters with parameters set by an operator to obtain a measure of the error in the scan; and d) storing in a memory the position function parameters, the measured error in the scan and the scan voltage function parameters.

21. The method of claim 1 or claim 2 or claim 3 or claim 4 or claim 5 or claim 6 or claim 7 or claim 8 or claim 9 or claim 10 or claim 11 or claim 12 or claim 13 or claim 14 or claim 15 or claim 16 or claim 17 or claim 18 or claim 19 or claim 20 wherein said scanning probe microscope is an atomic force microscope.

22. The method of claim 21 wherein said scanning probe microscope is an atomic force microscope, and wherein said scanner is driven, at least in part, by at least one piezoelectric element.

23. The method of claim 1 or claim 2 or claim 3 or claim 4 or claim 5 or claim 6 or claim 7 or claim 8 or claim 9 or claim 10 or claim 11 or claim 12 or claim 13 or claim 14 or claim 15 or claim 16 or claim 17 or claim 18 or claim 19 or claim 20 wherein said scanning probe microscope is a scanning tunnelling microscope.

24. The method of claim 23 wherein said scanning probe microscope is a scanning tunneling microscope, and wherein said scanner is driven, at least in part, by at least one piezoelectric element.

25. The method of claim 21 wherein the number of parameters in the parametric functions which are updated depends on the scan size, and wherein said number is smaller for smaller scan sizes.

26. The method of claim 22 wherein the number of parameters in the parametric functions which are updated depends on the scan size, and wherein said number is smaller for smaller scan sizes.

27. The method of claim 23 wherein the number of parameters in the parametric functions which are updated depends on the scan size, and wherein said number is smaller for smaller scan sizes.

28. The method of claim 24 wherein the number of parameters in the parametric functions which are updated depends on the scan size, and wherein said number is smaller for smaller scan sizes.

29. In a method of controlling scanning of a scanning probe microscope with a scanner having a moveable probe attached to said scanner, said probe having a free end, the steps of applying to said scanner a scan voltage which varies according to a parametric equation to generate scanning motion of said scanner, sensing plural position data of said free end of said probe during said scanning, and updating parameters of said parametric equation based on said plural position data to produce linear scanning of said scanner.

30. The method of claim 29, wherein said updating includes the step of selecting a number of parameters to be updated in relation to increasing or decreasing sensed signal-to-noise ratio.

31. The method of claim 29, comprising:

selecting a scanner including at least one piezoelectric or electrostrictive element.

32. The method of claim 29, wherein said step of monitoring said scanning includes the steps of:

sensing plural position data with a position sensor selected from the group consisting of optical interferometers and capacitive sensors.

33. The method of claim 29, wherein said step of applying said scan voltage comprises the step of:

choosing as said parametric function a nonlinear waveform V(t), given by:

$$V(t)=a+bt+ct^2[\text{or}]+dt^3 \ldots$$

where a, b, c, . . . are adjustable parameters and t is the time along the scan line.

34. The method of claim 29, further comprising collecting image data at the time of said sensing.

35. The method of claim 29, further comprising calculating a voltage increment to be added to said scan voltage at least twice during said scanning.

36. The method of claim 29, wherein said step of updating said parameters includes at least one of the steps of:

updating said parameters before scanning an image;

updating said parameters at selected intervals within a scan;

updating said parameters iteratively;

updating said parameters based on parameters stored in a memory; and updating said parameters while scanning an image by extrapolating from parameter values obtained from previous scans.

37. The method of claim 29 or claim 30 or claim 31 [or claim 23] or claim 33 or claim 34 or claim 35 or claim 36 wherein said scanning probe microscope is an atomic force microscope.

38. The method of claim 37 wherein said scanner is driven, at least in part, by at least one piezoelectric element.

39. The method of claim 29 or claim 30 or claim 31 [or claim 23] or claim 33 or claim 34 or claim 35 or claim 36 wherein said scanning probe microscope is a scanning tunneling microscope.

40. The method of claim 39 wherein said scanner is driven, at least in part, by at least one piezoelectric element.

41. The method of claim 37 wherein said parametric function is a parametric function of time.

42. The method of claim 38 wherein said parametric function is a parametric function of time.

43. The method of claim 39 wherein said parametric function is a parametric function of time.

44. The method of claim 40 wherein said parametric function is a parametric function of time.

45. The method of claim 1 or claim 2 or claim 3 or claim 4 or claim 11 or claim 12 or claim 13 or claim 14 or claim 15 or claim 16 or claim 17 or claim 19 or claim 20 or claim 29 or claim 30 or claim 31 or claim 32 or claim 34 or claim 35 or claim 36 [or claim 37 or claim 38 or claim 39 or claim

40 or claim 41 or claim 42 or claim 43 or claim 44] wherein, for small scans, the number of parameters that are updated are 2, corresponding to the scan size and average scan position.

*46. In a method of controlling a scanning motion for a scanning probe microscope with a scanner having an attached end and a free end in which positioning of the free end is controlled by application of a scan voltage to the scanner, the improvement comprising the steps of:*

*a) applying to said scanner a scan voltage which varies as a predetermined parametric function to generate a scanning motion;*

*b) monitoring said scanning motion with a position sensor by sensing plural position data of said free end along a selected coordinate; and*

*c) updating at least one parameter of said predetermined parametric function based on the sensed plural position data to produce a linear scan of desired size and offset.*

*47. The method of claim 46 further comprising the step of: selecting the number of parameters which are updated in relation to decreasing position sensor signal-to-noise ratio.*

*48. The method of claim 46 comprising: selecting a scanner which includes materials selected from the group consisting of piezoelectrics or electrostrictives.*

*49. The method of claim 46, wherein said step of monitoring the scanning motion includes the step of: sensing plural position data with a position sensor selected from the group consisting of optical interferometers and capacitive sensors.*

*50. The method of claim 46, wherein said step of applying said scan voltage comprises the step of: choosing as said parametric function a nonlinear waveform V(t), given by:*

$$V(t)=a+bt+ct^2+dt^3 \ldots$$

*where a, b, c, . . . are adjustable parameters and t is the time along the scan line.*

*51. The method of claim 46, wherein said step of monitoring said scanning movement includes the step of:*

*calculating from said position data parameters of a position function describing said scanning movement; and*

*storing the position function parameters in a memory.*

*52. The method of claim 51 wherein said step of controlling a parameter of said scan voltage parametric function includes the step of:*

*comparing said position function parameters to desired scan parameters set by an operator; and*

*compensating for any difference between said position function parameters and said desired scan parameters by adjusting the parameters of said scan voltage.*

*53. The method of claim 51, wherein said step of calculating the parameters of a position function includes the step of:*

*determining the parameters of a general position function by a least-squares fit of a polynomial of a predetermined order to the motion sensor position data.*

*54. The method of claim 53, wherein said step of calculating the parameters of a polynomial position function includes the step of:*

*selecting the order of the terms of the polynomial in relation to the size of the scanning motion.*

*55. The method of claim 50, wherein the higher order coefficients of said nonlinear waveform are fixed at predetermined values while the lower order parameters are adjusted to control scanner motion.*

*56. The method of claim 46, wherein said step of monitoring said scanning movement includes the step of:*

*collecting image data at the time of said sensing of scanner position data.*

*57. The method of claim 46, wherein said step of applying a scan voltage to the scanner includes the step of:*

*calculating a voltage increment to be added to said scan voltage at least twice during scanning.*

*58. The method of claim 46 wherein said step of updating the parameters of the scan voltage parametric function includes at least one of the steps of:*

*updating said at least one parameter of said scan voltage parametric function prior to scanning an image;*

*updating said at least one parameter of said scan voltage parametric function at selected intervals within a scan;*

*updating said at least one parameter of said scan voltage parametric function iteratively;*

*updating said at least one parameter of said scan voltage parametric function based on the scan voltage function parameters stored in a memory; and*

*continuously updating said at least one parameter of said scan voltage parametric function while scanning an image by extrapolating from parameter values obtained from previous scans.*

*59. The method of claim 51 wherein said step of monitoring said scanning movement includes the step of:*

*calculating the parameters of a position function from the data for the forward scan direction and from the data for the backward scan direction.*

*60. The method of claim 46, wherein said step of monitoring said scanning movement includes the step of:*

*sensing plural position data with an optical interferometer having a periodic output.*

*61. The method of claim 59, wherein said step of updating the parameters of said scan voltage parametric function includes the step of:*

*adjusting the parameters of the scan voltage parametric function until the differences between the parameters of the position function for the forward scan direction and the parameters of the position function for the backward scan direction are minimized, whereby parameters of the scan voltage parametric function are established to compensate for the nonlinearity of the piezoelectric scanner.*

*62. The method of claim 60, wherein said step of sensing plural position data with an optical interferometer includes the step of:*

*storing in a memory during a scan a motion sensor waveform from the optical interferometer; and*

*comparing the motion sensor waveforms from subsequent scans by cross correlation.*

*63. The method of claim 46, wherein scanning is performed along two, generally orthogonal axes, and said monitoring step includes sensing plural position data along both of said axes, and said controlling step controls scanning motion along both of said axes.*

*64. In a method of controlling a scanning motion for a scanning probe microscope with a scanner having an attached end and a free end in which positioning of the free end is controlled by application of a scan voltage to the scanner, the improvement comprising the steps of:*

*a) applying to said scanner a scan voltage which varies as a predetermined parametric function to generate a scanning motion;*

*b) monitoring said scanning motion with a position sensor by sensing plural position data of said free end along a selected coordinate;* c) calculating at least one parameter of a scan position function from the scanner position data;

d) storing said at least one parameter of said scan position function in a memory;

e) comparing the scan position function parameters with parameters set by an operator and parameters stored in the memory to obtain a measure of the error in the scan; and f) using a look-up table relating the measured error in the scan to said at least one scan voltage parameter to adjust at least one of the scan voltage parameters in order to reduce the error in the scan.

65. The method of claim 64, wherein said look-up table relating the error in the scan to said at least one adjustable scan voltage parameters is obtained by a precalibration procedure including the steps of:

a) driving the scanner with a waveform determined by the scan voltage parametric function to scan a known subject surface containing a distance calibration marking and produce scanner position data regarding the characteristics of said known subject surface;

b) calculating at least one parameter of a scan position function from the scanner position data;

c) comparing said at least one scan position function parameter with one or more parameters set by an operator to obtain a measure of the error in the scan; and d) storing in a memory said at least one position function parameter, the measured error in the scan and at least one scan voltage function parameter.

66. The method of claim 46 or claim 47 or claim 48 or claim 49 or claim 50 or claim 51 or claim 52 or claim 53 or claim 54 or claim 55 or claim 56 or claim 57 or claim 58 or claim 59 or claim 60 or claim 61 or claim 62 or claim 64 or claim 65 wherein said scanning probe microscope is an atomic force microscope.

67. The method of claim 66 wherein said scanning probe microscope is an atomic force microscope, and wherein said scanner is driven, at least in part, by at least one piezoelectric element.

68. The method of claim 66 wherein the number of parameters in the parametric functions which are updated depends on the scan size, and wherein said number is smaller for smaller scan sizes.

69. The method of claim 67 wherein the number of parameters in the parametric functions which are updated depends on the scan size, and wherein said number is smaller for smaller scan sizes.

70. In a method of controlling scanning of a scanning probe microscope with a scanner having a moveable probe attached to said scanner, said probe having a free end, the steps of applying to said scanner a scan voltage which varies according to a parametric equation to generate scanning motion of said scanner, sensing plural position data of said free end of said probe during said scanning, and updating at least one of the parameters of said parametric equation based on said plural position data to produce linear scanning of said scanner.

71. The method of claim 70, wherein said updating includes the step of selecting a number of parameters to be updated in relation to increasing or decreasing sensed signal-to-noise ratio.

72. The method of claim 70, comprising:

selecting a scanner including at least one piezoelectric or electrostrictive element.

73. The method of claim 70, wherein said step of monitoring said scanning includes the steps of:

sensing plural position data with a position sensor selected from the group consisting of optical interferometers and capacitive sensors.

74. The method of claim 70, wherein said step of applying said scan voltage comprises the step of: choosing as said parametric function a nonlinear waveform $V(t)$, given by:

$$V(t)=a+bt+ct^2+dt^3 \ldots$$

where a, b, c, . . . are adjustable parameters and t is the time along the scan line.

75. The method of claim 70, further comprising collecting image data at the time of said sensing.

76. The method of claim 70, further comprising calculating a voltage increment to be added to said scan voltage at least twice during said scanning.

77. The method of claim 70, wherein said step of updating said at least one parameter includes at least one of the steps of:

updating said at least one parameter before scanning an image;

updating said at least one parameter at selected intervals within a scan;

updating said at least one parameter iteratively;

updating said at least one parameter stored in a memory; and updating said at least one parameter while scanning an image by extrapolating from parameter values obtained from previous scans.

78. The method of claim 70 or claim 71 or claim 72 or claim 73 or claim 74 or claim 75 or claim 76 or claim 77 wherein said scanning probe microscope is an atomic force microscope.

79. The method of claim 78 wherein said scanner is driven, at least in part, by at least one piezoelectric element.

80. The method of claim 78 wherein said parametric function is a parametric function of time.

81. The method of claim 79 wherein said parametric function is a parametric function of time.

82. The method of claim 46 or claim 47 or claim 48 or claim 49 or claim 56 or claim 57 or claim 58 or claim 59 or claim 60 or claim 61 or claim 62 or claim 64 or claim 65 or claim 70 or claim 71 or claim 72 or claim 73 or claim 75 or claim 76 or claim 77 wherein, for small scans, the number of parameters that is updated is 1, corresponding to the average scan position.

83. The method of claim 78, wherein, for small scans, the number of parameters that is updated is 1, corresponding to the average scan position.

84. The method of claim 79, wherein, for small scans, the number of parameters that is updated is 1, corresponding to the average scan position.

85. The method of claim 37, wherein, for small scans, the number of parameters that is updated are 2, corresponding to the scan size and the average scan position.

86. The method of claim 38, wherein, for small scans, the number of parameters that is updated are 2, corresponding to the scan size and the average scan position.

87. The method of claim 39, wherein, for small scans, the number of parameters that is updated are 2, corresponding to the scan size and the average scan position.

*88. The method of claim 23, wherein said scanning probe microscope is an atomic force microscope.*

*89. The method of claim 23, wherein said scanning probe microscope is a scanning tunneling microscope.*

*90. The method of claim 40, wherein, for small scans, the number of parameters that are updated are 2, corresponding to the scan size and average scan position.*

*91. The method of claim 41, wherein, for small scans, the number of parameters that are updated are 2, corresponding to the scan size and average scan position.*

*92. The method of claim 42, wherein, for small scans, the number of parameters that are updated are 2, corresponding to the scan size and average span position.*

*93. The method of claim 43, wherein, for small scans, the number of parameters that are updated are 2, corresponding to the scan size and average scan position.*

*94. The method of claim 44, wherein, for small scans, the number of parameters that are updated are 2, corresponding to the scan size and average scan position.*

* * * * *